(12) United States Patent
Friend

(10) Patent No.: US 10,641,862 B2
(45) Date of Patent: May 5, 2020

(54) RANGING RADIO RELATIVE MACHINE POSITIONING SYSTEM AND METHOD

(71) Applicant: Caterpillar Inc., Peoria, IL (US)

(72) Inventor: Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 447 days.

(21) Appl. No.: 15/473,059

(22) Filed: Mar. 29, 2017

(65) Prior Publication Data

US 2018/0284219 A1 Oct. 4, 2018

(51) Int. Cl.
 G01S 5/02 (2010.01)
 G01S 13/76 (2006.01)
 E02F 9/26 (2006.01)
 E02F 9/20 (2006.01)
 B60W 50/14 (2020.01)

(52) U.S. Cl.
 CPC .......... G01S 5/0284 (2013.01); E02F 9/2025 (2013.01); E02F 9/264 (2013.01); G01S 5/0263 (2013.01); G01S 13/765 (2013.01); B60W 2050/146 (2013.01); B60W 2300/17 (2013.01); B60W 2420/62 (2013.01); B60Y 2200/14 (2013.01); B60Y 2200/412 (2013.01)

(58) Field of Classification Search
 CPC ....... B60W 2050/146; B60W 2300/17; B60W 2420/62; B60Y 2200/14; B60Y 2200/412; E02F 3/308; E02F 3/32; E02F 3/38; E02F 3/401; E02F 9/264; G01S 5/0263; G01S 5/0284
 USPC ........................................................ 342/454
 See application file for complete search history.

(56) References Cited

U.S. PATENT DOCUMENTS

| 5,848,368 A * | 12/1998 | Allen | G07C 5/008 |
| | | | 701/50 |
| 8,405,721 B2 | 3/2013 | Bilandi | |
| 2005/0000703 A1* | 1/2005 | Furuno | G01G 19/08 |
| | | | 172/2 |
| 2005/0197755 A1* | 9/2005 | Knowlton | E02F 9/2037 |
| | | | 701/50 |
| 2012/0215394 A1* | 8/2012 | Wang | A01D 41/1278 |
| | | | 701/24 |
| 2014/0146167 A1* | 5/2014 | Friend | G01S 17/023 |
| | | | 348/118 |

(Continued)

FOREIGN PATENT DOCUMENTS

JP 2015194933 A 11/2015

*Primary Examiner* — Timothy X Pham

(74) *Attorney, Agent, or Firm* — Miller, Matthias & Hull

(57) ABSTRACT

A ranging radio relative machine positioning system for a first mobile machine and a second mobile machine is provided. The first mobile machine includes a platform rotatable relative to ground-engaging elements of the first mobile machine. A first set of ranging radios and at least one sensor are configured for attachment to the first mobile machine, and a second set of ranging radios are configured for attachment to the second mobile machine. The system also includes a controller programmed to identify a ground spotting location relative to the first mobile machine, track movement of the first mobile machine relative to the ground spotting location using the sensor to arrive at an offset, and provide a location, or pose, of the second mobile machine relative to the ground spotting location using the first and second sets of ranging radios and the offset.

20 Claims, 3 Drawing Sheets

(56) References Cited

U.S. PATENT DOCUMENTS

2014/0261152 A1\* 9/2014 Tanaka .................. E02F 9/2033
                                                    116/230
2016/0224026 A1\* 8/2016 Hamada ............... G05D 1/0011
2016/0238403 A1  8/2016 Brown
2017/0114519 A1\* 4/2017 Hague ..................... E02F 3/434
2017/0192419 A1\* 7/2017 Ray ........................ A01D 43/07

\* cited by examiner

RANGING RADIO RELATIVE MACHINE POSITIONING SYSTEM AND METHOD

TECHNICAL FIELD

The present disclosure relates generally to a machine positioning system using ranging radios and, more particularly, to positioning a mobile machine relative to a ground spotting location.

BACKGROUND

There is a growing need for guidance, operator assist, and autonomous solutions for construction and mining. Thus, the accuracy and reliability of monitoring and controlling operations and/or the machines is becoming more important. A common operation is the spotting and loading of trucks with rotational platforms such as excavators, front shovels, and rope shovels. This includes both the spotting of the trucks as well as the swinging and dumping of the material into the trucks. A key enabling technology for operations such as these is positioning. GNSS, laser, and ranging radios are commonly used in positioning systems; however, each of the methods suffers drawbacks.

U.S. Patent Application Publication No. 2016/0238403 to Brown et al. discloses an assistive vehicular guidance system for locating a spotter vehicle in a target location near a target machine. The guidance system includes global positioning sensors and user interfaces providing visual and/or auditory cues. The guidance system also includes long-range and short-range network radios and an analyzer. The analyzer interfaces with the global positioning sensor to plan a path for the spotter vehicle, and utilizes the long-range and/or short-range network radios for communication between the spotter vehicle and the target machine.

As should be appreciated, there is a continuing need for positioning systems having improved accuracy and/or efficiency. The present disclosure is directed to such an effort.

SUMMARY OF THE INVENTION

In one aspect, a ranging radio relative machine positioning system for a first mobile machine and a second mobile machine is provided. The first mobile machine includes a platform rotatable relative to ground-engaging elements of the first mobile machine. A first set of ranging radios and at least one sensor are configured for attachment to the first mobile machine, and a second set of ranging radios are configured for attachment to the second mobile machine. The system also includes a controller programmed to identify a ground spotting location relative to the first mobile machine, track movement of the first mobile machine relative to the ground spotting location using the sensor to arrive at an offset, and provide a location of the second mobile machine relative to the ground spotting location using the first and second sets of ranging radios and the offset.

In another aspect, a method of generating a ground spotting location relative to a first mobile machine using a ranging radio relative machine positioning system for the first mobile machine and a second mobile machine is provided. The first mobile machine includes a platform rotatable relative to ground-engaging elements of the first mobile machine. The method includes steps of identifying an electronically stored ground spotting location relative to the first mobile machine, determining movement of the first mobile machine relative to the electronically stored ground spotting location using a sensor supported on the first mobile machine to arrive at an offset, and providing a location of the second mobile machine relative to the electronically stored ground spotting location using a first set of ranging radios supported on the first mobile machine, a second set of ranging radios supported on the second mobile machine, the offset, and a controller.

DETAILED DESCRIPTION

Figure 1:
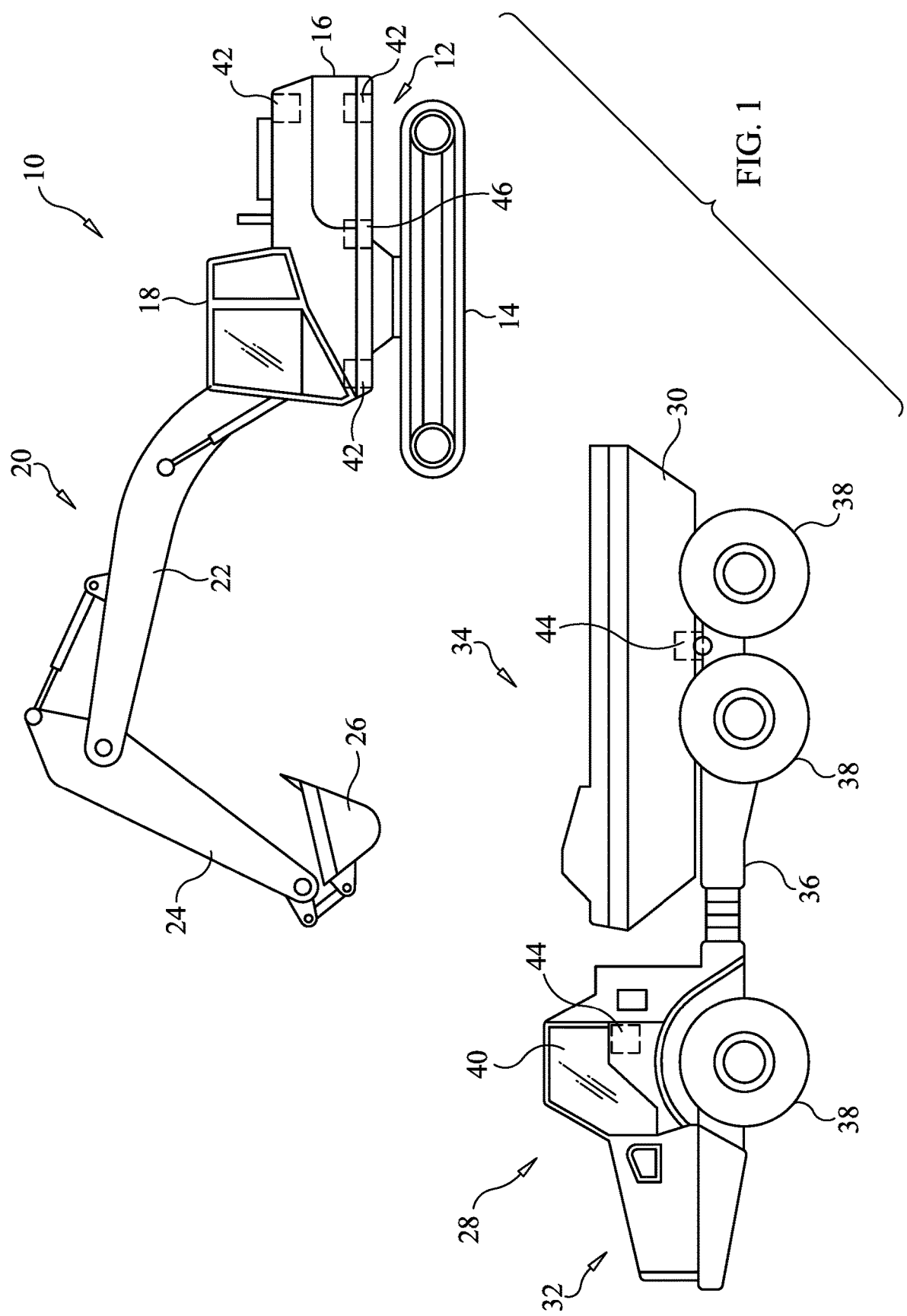
FIG. 1 is a diagram of a first mobile machine and a second mobile machine utilizing the ranging radio relative machine positioning system, according to an exemplary embodiment of the present disclosure.

A first mobile machine utilizing a ranging radio relative machine positioning system, according to the present disclosure, is shown at 10 in FIG. 1. The first mobile machine 10 may be a loader, such as, for example, an excavator, front shovel, or rope shovel. As such, the first mobile machine 10 may include a frame 12 supporting ground engaging elements 14 and a rotatable platform 16. The rotatable platform 16 may include an operator control station 18, in which an operator may sit and use controls and displays to operate an implement 20, which may include a boom 22, stick 24, and bucket 26, as shown.

A second mobile machine 28 utilizing the disclosed ranging radio relative machine positioning system may be a hauling vehicle, such as, for example, a dump truck having a dump body 30. The second mobile machine 28 may include a front frame portion 32 pivotable relative to a rear frame portion 34 about an articulation joint 36. Both of the front frame portion 32 and the rear frame portion 34 may support ground engaging elements 38, such as wheels. An operator control station 40 may be supported on the front frame portion 32 and may provide an enclosed area in which an operator may use controls and displays to operate the second mobile machine 28 and control the dump body 30.

A common operation, or task, performed by the first mobile machine 10 and the second mobile machine 28 at a work site may include spotting of the second mobile machine 28 relative to the first mobile machine 10 and using the first mobile machine 10 to swing and dump material into the dump body 30 of the second mobile machine 28. A positioning system may be used for determining the relative positions and orientations, or "poses," of the first and second mobile machines 10, 28 relative to one another to improve accuracy, efficiency, and safety of the operation. This is especially important in autonomous or semi-autonomous operations.

Although the ranging radio relative machine positioning system of the present disclosure is described in the context of the first mobile machine 10 dumping material into the dump body 30 of the second mobile machine 28, the system and method disclosed herein are broadly applicable to a wide range of operations performed by a wide range of machines and systems, where determining positions and orientations of components is needed.

Figure 2:
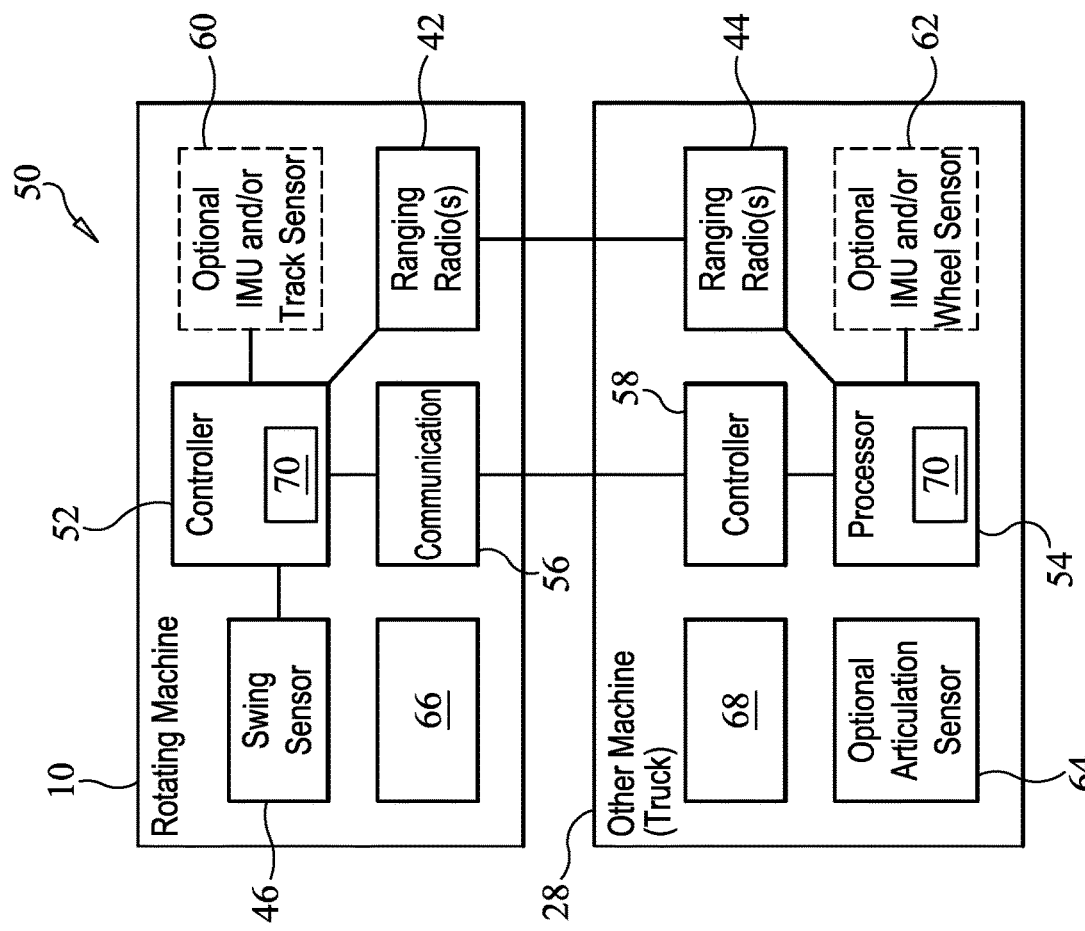
FIG. 2 is a block diagram of machine components of the ranging radio relative machine positioning system for each of the first and second mobile machines of FIG. 1.

As shown in FIG. 1, components of an exemplary ranging radio relative machine positioning system, illustrated in FIG. 2, may include a first set of ranging radios 42 configured for attachment, at various locations, to the first mobile machine 10 and a second set of ranging radios 44 configured for attachment, at various locations, to the second mobile machine 28. The first set of ranging radios 42 and the second set of ranging radios 44 may provide range measurements, and/or positions and orientations, or poses, relative to or between the first set of ranging radios 42 and the second set of ranging radios 44 using time of flight analysis. It should be appreciated that "set" includes more than one, or a plurality, of ranging radios 42, 44.

To perform a range measurement, for example, one of the ranging radios 42 supported on the first mobile machine 10 may transmit a message, which includes an address of one of the ranging radios 44 supported on the second mobile machine 28. At the time of transmission, the ranging radio 42 may start a timer. When the ranging radio 44 receives the message, it will generate a return message that includes the time of receipt and the time of transmission of the response. The ranging radio 42 records the time of receipt of the return message and captures the time lapsed on the counter. The range may be calculated based on the time it takes for the message transmitted by the ranging radio 42 to reach the ranging radio 44 and be returned. In operation, each of the ranging radios 42, 44 are configured to communicate with all of the other ranging radios 42, 44.

The first mobile machine 10 may include any number of ranging radios 42, positioned at different fixed locations of the first mobile machine 10, and the second mobile machine 28 may include any number of ranging radios 44, positioned at different fixed locations of the second mobile machine 28. Preferably, each of the first and second mobile machines 10, 28 include a sufficient number of ranging radios 42, 44 such that each radio location may be triangulated or otherwise determined with a relatively high level of confidence and reliability. Having multiple ranging radios 42, 44 located at different positions on the respective machines 10, 28 enables the calculation of not only range, but also relative pose of the first and second mobile machines 10, 28.

At least one sensor 46 may be configured for attachment to the first mobile machine 10. According to the exemplary embodiment, the at least one sensor 46 may be a swing sensor, or other similar sensor, 46 positioned and configured to measure rotational movement of the rotatable platform 16 of the first mobile machine 10 relative to the ground-engaging elements 14. For reasons that will become apparent below, the swing sensor 46 may be used with the first set of ranging radios 42 and the second set of ranging radios 44 to determine pose using the disclosed ranging radio relative machine positioning system.

Turning now to FIG. 2, a block diagram illustrates components of an exemplary ranging radio relative machine positioning system 50. The ranging radio relative machine positioning system 50 may include or utilize a control system, including one or more controllers, for managing and/or monitoring machines and/or operations at a work site. According to the exemplary embodiment, the first mobile machine 10 may include a controller 52 and the second mobile machine 28 may include a controller 54. Each of the controllers 52, 54 may communicate with additional control systems, components and/or systems of the respective machines 10, 28, and with each another. Further, the controllers 52, 54 may be configured to directly or indirectly communicate with systems off-board and/or off-site.

The controller 52 of the first mobile machine 10 may be configured to communicate with the first set of ranging radios 42, swing sensor 46, additional sensors 60, and/or various other systems and devices. The controller 54 of the second mobile machine 28 may be configured to communicate with the second set of ranging radios 44, sensors 62, 64, and/or various other systems and devices. The controllers 52, 54, and/or other components or devices, may also be configured to communicate with each other via respective communication systems 56, 58. The ranging radios 42, 44 of the first and second mobile machines 10, 28 may communicate directly with one another to provide the range measurements, as described above.

Each of the controllers 52, 54 may include hardware and software for receiving, sending, processing, analyzing and/or storing data, such as in the form of signals, regarding all or portions of the functions performed by the first mobile machine 10 and the second mobile machine 28. For example, each of the controllers 52, 54 may be of standard design and may include a processor, such as, for example, a central processing unit, a memory, and an input/output circuit that facilitates communication internal and external to the respective controller 52, 54. The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. In addition, data may be stored in and/or accessed from a database, which may be located on-board or off-board.

The processor may control operation of the respective controller 52, 54 by executing operating instructions, such as, for example, computer readable program code stored in the memory, wherein operations may be initiated internally or externally to the controller 52, 54. A control scheme may be utilized that monitors outputs of systems or devices, such as, for example, ranging radios 42, 44, sensors 46, 60, 62, 64, actuators, or control units, via an input/output circuit and controls inputs to various other systems or devices, including, for example, respective user interface displays 66, 68. Further, the controllers 52, 54 may be programmed to collect, review, and/or analyze data for machine positioning, as described herein.

Figure 3:
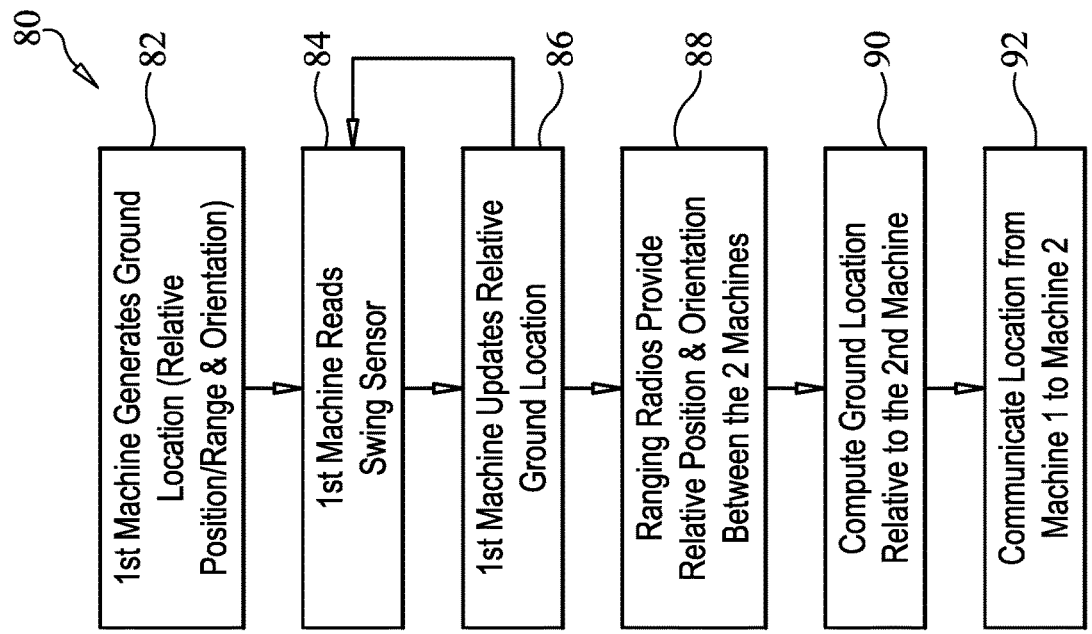
FIG. 3 is a flow diagram illustrating an exemplary method of operating the ranging radio relative machine positioning system of the present disclosure.

According to an exemplary embodiment of the present disclosure, the controllers 52, 54 may each be programmed to execute a positioning program 70. As will be described below, an exemplary method of using the ranging radio relative machine positioning system 50 or, more specifically, generating a ground spotting location for positioning the second mobile machine 28 relative to the first mobile machine 10 may include execution of the positioning program 70, which is illustrated as a flow diagram 80 in FIG. 3. The method may be implemented in whole or in part by one or both of the controllers 52, 54, and/or additional or alternative controllers, ranging radios 42, 44, communication systems 56, 58, and sensor 46, with all or portions of the method running continuously or intermittently, such as at predetermined intervals, when manually initiated, or when triggered.

Figure 6:
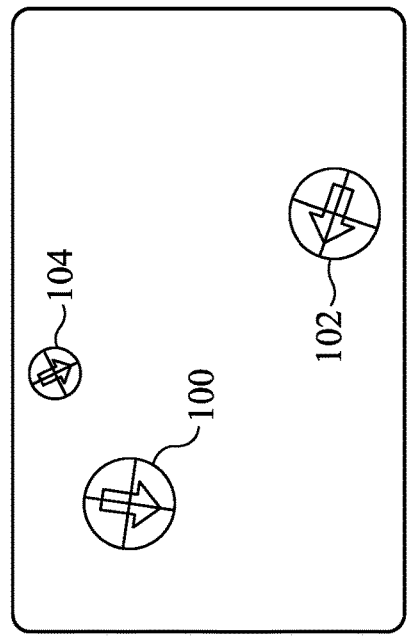
FIG. 6 is a diagram of the relative poses of the first mobile machine, the second mobile machine, and the ground spotting location.
Figure 5:
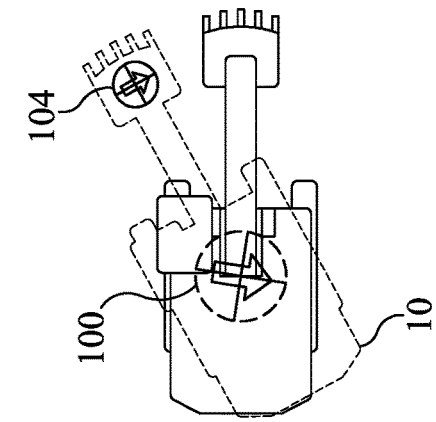
FIG. 5 is a diagram of the first mobile machine and an illustration of the identification and tracking of a ground spotting location relative to the first mobile machine.
Figure 5:
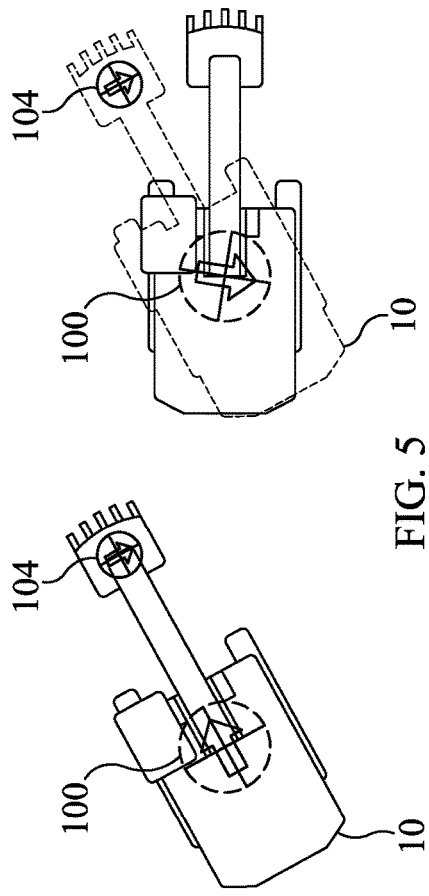

The method disclosed herein includes a first step, at box 82, which includes the first mobile machine 10 generating a ground spotting location, or pose, which may be a ground location, selected or identified by the first mobile machine 10, to which the second mobile machine 28 is to travel. The ground spotting location, which is illustrated in FIGS. 5 and 6, may be generated, identified, or selected in any of a number of different ways.

For example, the ground spotting location may be set to a current position, or pose, of the bucket 26 of the first mobile machine 10, such as relative to a known origin. In particular, an operator may position the bucket 26 at a desired position, or pose, and use that position, or pose, as the ground spotting location. Various known sensors, such as, for example, resolvers, hydraulic cylinder sensors, inertial sensors, and the like, may be used to identify the position, or pose, of the bucket 26 relative to a known origin, such as a machine origin, to which the ranging radios 42 may also be referenced.

According to another example, an operator again moves the bucket 26 to a desired location, or pose. However, rather than measuring the current bucket position, the orientation or heading of the first mobile machine 10 may be used, along with a loading radius offset from a known origin, such as a machine origin, to which the ranging radios 42 may also be referenced. Since the actual bucket position is not being used, a user interface may be provided to allow an operator to adjust the loading radius or offset of the ground spotting location.

Alternatively, the ground spotting location may be selected without moving the bucket 26 to a desired location or pointing the first mobile machine 10 in a particular direction. For example, using an ideal loading radius with an adjustable offset, an operator may select a location, such as an angle or angle of rotation about the first mobile machine 10, to be used for the ground spotting location.

Once the ground spotting location is generated or identified, the method proceeds to box 84, at which the first mobile machine 10 monitors and/or reads the swing sensor 46. As the rotatable platform 16 of the first mobile machine 10 is rotated relative to the frame 12, the swing sensor 46 may be used to measure or track the rotational movement of the first mobile machine 10, particularly in relation to the ground spotting location, as shown at box 86. That is, the rotational movement of the rotatable platform 16 relative to the ground spotting location is tracked, using the swing sensor 46, to arrive at an offset (e.g., a rotational deviation of the rotatable platform 16 from the position at which the ground spotting location is generated).

At box 88, the first set of ranging radios 42 and the second set of ranging radios 44, along with controllers 52, 54 and communication systems 56, 58, may provide range measurements between the first set of ranging radios 42 and the second set of ranging radios 44 using time of flight analysis, as described above. In particular, the first and second sets of ranging radios 42, 44 enable each of the first and second mobile machines 10, 28 to track pose of the other relative to itself. For example, the controllers 52, 54 may be configured to determine the pose of each of the first and second mobile machines 10, 28 based on information from the ranging radios 42, 44.

In addition to assisting with positioning the first mobile machine 10 and the second mobile machine 28 relative to one another, the disclosed method assists with positioning the second mobile machine 28 relative to the ground spotting location. In particular, the system and method of the present disclosure may be used to guide or navigate the second mobile machine 28 to the ground spotting location. As such, a next step in the method, at box 90, includes computing a position or pose of the second mobile machine 28 relative to the ground spotting location, using the first and second sets of ranging radios 42, 44 and the offset, which represents rotational movement or deviation of the first mobile machine 10 relative to the ground spotting location. As such, information regarding the ground spotting location is transmitted, or communicated, from the first mobile machine 10 to the second mobile machine 28 using communication systems 56, 58, at box 92.

According to some embodiments, the positioning information may be displayed on the user interface display 66, 68 to guide the second mobile machine 28 to the ground spotting location. The user interface display 66, 68 may incorporate visual and/or auditory cues to assist an operator of the second mobile machine 28 in navigating to the ground spotting location. User interfaces for guiding and/or providing a path for a machine to a destination are known and, therefore, will not be discussed herein in greater detail.

Figure 4:
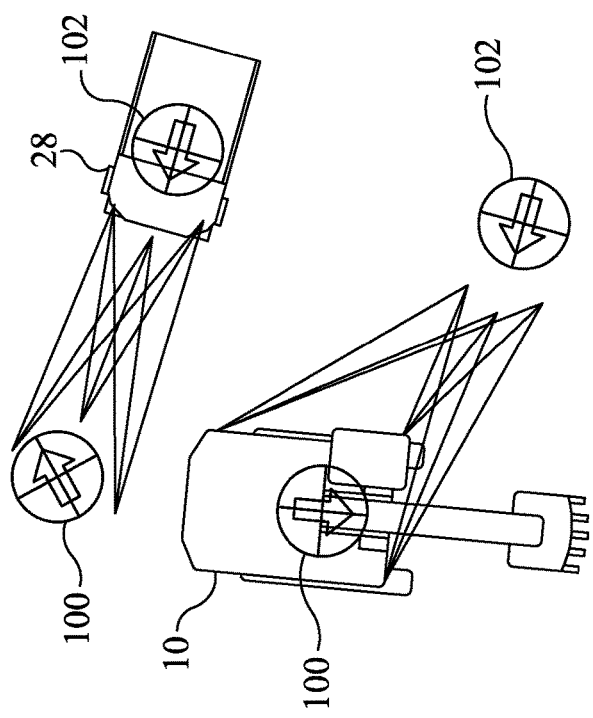
FIG. 4 is a diagram of each of the first and second mobile machines identifying a relative pose of the other.

An illustration of the first and second mobile machines 10, 28 using ranging radios 42, 44 (FIGS. 1 and 2) to calculate the relative position and orientation between the first and second mobile machines 10, 28 is provided in FIG. 4. That is, the first mobile machine 10 is able to track a pose 102 of the second mobile machine 28 relative to itself, and the second mobile machine 28 is able to track a pose 100 of the first mobile machine 10 relative to itself.

Turning now to FIG. 5, an illustration of the identification and tracking, or determination, of the ground spotting location, or pose, 104 relative to the first mobile machine 10 is provided. Once the ground spotting location, or pose, 104 is identified, according to one of the methods described above, the first mobile machine 10 monitors or reads the swing sensor 46 to track and update the ground spotting location, or pose, 104. In particular, for example, the method may include tracking movement or, more particularly, rotational movement of the first mobile machine 10, or rotatable platform 16, relative to the ground spotting location, or pose, 104 using the swing sensor 46 to arrive at an offset.

FIG. 6 is a diagram of the relative poses 100, 102, 104 of the first mobile machine 10, the second mobile machine 28, and the ground spotting location. The ground spotting location, or pose, 104 relative to the second mobile machine 28 may be calculated a number of different ways. For example, the first mobile machine 10, knowing the relative pose 102 of the second mobile machine 28 and the ground spotting location, or pose, 104 relative to itself, may calculate the ground spotting location, or pose, 104 relative to the second mobile machine 28 and communicate the position information to the second mobile machine 28.

According to another example, the first mobile machine 10 may communicate the ground spotting location, or pose, 104 relative to itself to the second mobile machine 28. The second mobile machine 28 then uses the information (along with the known relative poses 100, 102 between the first and second mobile machines 10, 28) to determine where the ground spotting location, or pose, 104 is relative to itself.

Each of the first mobile machine 10 and the second mobile machine 28 may include additional sensors, or devices, identified generally at 60, 62, 64 of FIG. 1, integrated for use with the ranging radio relative machine positioning system 50. When fused with the ranging radio relative position information, the sensors 60, 62, 64 may provide a more robust positioning system, allowing the system to identify potential errors, provide position/orientation information for short durations when or if the communication between the ranging radios 42, 44 is interrupted, and provide a faster update rate/position and orientation solution output rate than what the ranging radios 42, 44 can provide by themselves.

The sensors 60, 62, 64 may also be used to keep track of the ground spotting location, or pose, 104 relative to the ground or to one of the first and second mobile machines 10, 28. That is, the ranging radios 42, 44 do not have any way to know where the ground is unless one of the machines 10, 28 never moves or unless at least one of an IMU, track sensor, wheel sensor, or rotational sensor, each of which is identified at one or more of 60, 62, 64, is used to measure how the first and second mobile machines 10, 28 are moving/rotating compared to the ground. If the first mobile machine 10 sets a ground spotting location, or pose, 104 on the ground, the swing sensor 46 can keep track of where the ground spotting location, or pose, 104 is if the first mobile machine 10 rotates. In addition, the track sensors and/or IMUs, illustrated as one or more of sensors 60, 62, 64, can keep track of where the ground spotting location, or pose, 104 is on the ground in response to translational movement of the first mobile machine 10. Yet further, articulation sensor 64 may assist in determining the position and/or orientation of an articulated machine, such as, for example, the second mobile machine 28.

INDUSTRIAL APPLICABILITY

The present disclosure relates generally to a machine positioning system. More particularly, the present disclosure relates to a machine positioning system including a first set of ranging radios supported on a first mobile machine, wherein the first mobile machine includes a rotatable platform, and a second set of ranging radios supported on a second mobile machine. Yet further, the present disclosure is applicable to a ranging radio relative machine positioning system to guide the second mobile machine relative to a ground spotting location.

Referring generally to FIGS. 1-6, a common operation, or task, performed by a first mobile machine 10, including a rotatable platform 16, and a second mobile machine 28 at a work site or construction site may include spotting of the second mobile machine 28 relative to the first mobile machine 10 and, thereafter, using the first mobile machine 10 to swing and dump material into the dump body 30 of the second mobile machine 28. A positioning system may be used for determining the relative positions and orientations, or "pose," of the first and second mobile machines 10, 28 relative to one another to improve accuracy, efficiency, and safety of the operation.

According to the present disclosure, a ranging radio relative machine positioning system 50 may be used to navigate the second mobile machine 28 to a ground spotting location, or pose, 104. That is, the first and second mobile machines 10, 28 may utilize a positioning program 70, as disclosed herein. The first mobile machine 10 includes a first set of ranging radios 42 and the second mobile machine 28 includes a second set of ranging radios 44. Each of the first and second mobile machines 10, 28 may also include a controller 52, 54 for executing the positioning program 70.

According to the positioning program 70, a ground spotting location, or pose, 104 may be generated or identified relative to the first mobile machine 10. The rotational movement of the rotatable platform 16 of the first mobile machine 10 may be tracked relative to the ground spotting location, or pose, 104 using a swing sensor 46 to arrive at an offset. A location and/or pose 102 of the second mobile machine 28 relative to the ground spotting location, or pose, 104 may then be determined using the first and second sets of ranging radios 42, 44, swing sensor 46, the offset, and controllers 52, 54.

The above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A ranging radio relative machine positioning system for a first mobile machine and a second mobile machine, the first mobile machine including a platform rotatable relative to ground-engaging elements of the first mobile machine, the system including:
    a first set of ranging radios disposed on the first mobile machine and a second set of ranging radios disposed on the second mobile machine;
    a rotational movement sensor configured to track rotational movement of the platform;
    a controller in communication with the first set of ranging radios and the second set of ranging radios, wherein the controller is programmed to:
        determine a ground spotting location relative to the first mobile machine;
        determine an offset relative to the identified ground spotting location and the tracked rotational movement;
        determine a relative position between the first mobile machine and second mobile machine based on range measurements directly between the first set of ranging radios and the second set of ranging radios, wherein the range measurements are based on bi-directional communication between first set of ranging radios and the second set of ranging radios;
        determine a relative interim position between the second mobile machine and the ground spotting location based on the relative position and the offset; and
        guide the second mobile machine to the ground spotting location based on the determined relative interim location.

2. The ranging radio relative machine positioning system of claim 1, wherein wherein the range measurements are based on time-of-flight measurements of messages transmitted directly between the first set of ranging radios and the second set of ranging radios.

3. The ranging radio relative machine positioning system of claim 2, further including at least one additional sensor disposed on the first mobile machine and configured to measure translational movement of the first mobile machine, wherein the offset is determined based on the tracked rotational movement of the platform and the measured translational movement of the first mobile machine.

4. The ranging radio relative machine positioning system of claim 1; wherein the controller is further configured to determine a ground spotting pose relative to a known origin and the determined ground spotting position.

5. The ranging radio relative machine positioning system of claim 4, wherein the controller is further configured to to display on a user interface a path to guide the second mobile machine to the ground spotting location.

6. The ranging radio relative machine positioning system of claim 1, wherein the controller is further programmed to set the ground spotting location to a current bucket position of the first mobile machine relative to a known origin.

7. The ranging radio relative machine positioning system of claim 1, wherein the controller is further programmed to set the ground spotting location based on a current orientation of the first mobile machine and an ideal loading radius.

8. The ranging radio relative machine positioning system of claim 7, wherein the controller is further programmed to set the ground spotting location based on a heading of the first mobile machine and the ideal loading radius, wherein the ideal loading radius is adjustable.

9. The ranging radio relative machine positioning system of claim 1, wherein the controller is further programmed to set the ground spotting location based on an adjustable ideal loading radius.

10. The ranging radio relative machine positioning system of claim 1, wherein the offset is determined based on a rotational deviation between tracked rotational movement and the determined ground spotting location.

11. A method of generating a ground spotting location relative to a first mobile machine using a ranging radio relative machine positioning system for the first mobile machine and a second mobile machine, the first mobile machine including a platform rotatable relative to ground-engaging elements of the first mobile machine, the method including steps of:
  determining and electronically storing a ground spotting location relative to the first mobile machine;
  tracking rotational movement of the platform;
  determining an offset relative to the determined ground spotting location and the tracked rotational movement;
  determining a relative position between the first mobile machine and second mobile machine based on range measurements directly between a first set of ranging radios and a second set of ranging radios, wherein the range measurements are based bi-directional communication between first set of ranging radios and the second set of ranging radios;
  determining a relative interim location between the second mobile machine and the electronically stored ground spotting location based on the relative position and the offset; and
  guiding the second mobile machine to the ground spotting location based on determined relative interim location.

12. The method of claim 11, wherein the range measurements are based on time-of-flight measurements of messages transmitted directly between the first set of ranging radios and the second set of ranging radios.

13. The method of claim 12, the method further including determining a ground spotting pose relative to a known origin and the electronically stored ground spotting position.

14. The method of claim 13, the method further including displaying on a user interface a path to guide the second mobile machine to the ground spotting location.

15. The method of claim 11, wherein the determining step includes setting the electronically stored ground spotting location to a current bucket position of the first mobile machine relative to a known origin.

16. The method of claim 11, wherein the determining step includes setting the electronically stored ground spotting location based on a current orientation of the first mobile machine and an ideal loading radius.

17. The method of claim 16, wherein the determining step includes setting the electronically stored ground spotting location based on a heading of the first mobile machine and an ideal loading radius, wherein the ideal loading radius is adjustable.

18. The method of claim 11, wherein the determining step includes setting the electronically stored ground spotting location based on an adjustable ideal loading radius.

19. The method of claim 11, wherein at least one additional sensor disposed on the first mobile machine measures translational movement of the first mobile machine, wherein the offset is determined based on the tracked rotational movement of the platform and the measured translational movement of the first mobile machine.

20. The method of claim 11, wherein the offset is determined based on a rotational deviation between tracked rotational movement and the electronically stored ground spotting location.

* * * * *